US011878702B2

United States Patent
Schneider et al.

(10) Patent No.: US 11,878,702 B2
(45) Date of Patent: Jan. 23, 2024

(54) DRIVER ASSISTANCE SYSTEM AND METHOD FOR AN ASSISTED OPERATION OF A MOTOR VEHICLE

(71) Applicant: ZF ACTIVE SAFETY GMBH, Koblenz (DE)

(72) Inventors: Georg Schneider, Urbar (DE); Thomas Mueller, Munich (DE)

(73) Assignee: ZF ACTIVE SAFETY GMBH, Koblenz (DE)

( * ) Notice: Subject to any disclaimer, the term of this patent is extended or adjusted under 35 U.S.C. 154(b) by 299 days.

(21) Appl. No.: 17/297,653

(22) PCT Filed: Dec. 4, 2019

(86) PCT No.: PCT/EP2019/083697
§ 371 (c)(1),
(2) Date: Dec. 8, 2021

(87) PCT Pub. No.: WO2020/115145
PCT Pub. Date: Nov. 6, 2020

(65) Prior Publication Data
US 2022/0118993 A1    Apr. 21, 2022

(30) Foreign Application Priority Data
Dec. 7, 2018  (DE) .......................... 102018131470.1

(51) Int. Cl.
*B60W 50/02*   (2012.01)
*B60W 50/14*   (2020.01)
(Continued)

(52) U.S. Cl.
CPC .... *B60W 50/0225* (2013.01); *B60W 50/0205* (2013.01); *B60W 50/14* (2013.01);
(Continued)

(58) Field of Classification Search
CPC ................................................. B60W 50/0225
See application file for complete search history.

(56) References Cited

U.S. PATENT DOCUMENTS 10,118,613 B2    11/2018  Kang et al.
10,974,716 B2 *  4/2021   Rothhämel ........... B60W 30/12
(Continued)

FOREIGN PATENT DOCUMENTS

DE      102017005319 A1    2/2018
EP         3395634 A1     10/2018

*Primary Examiner* — Michael A Berns
(74) *Attorney, Agent, or Firm* — TAROLLI, SUNDHEIM, COVELL & TUMMINO L.L.P.

(57) ABSTRACT

The invention relates to a driver assistance system for a motor vehicle, comprising a surroundings sensor system, a controller, and an analysis module. The controller is equipped and designed so as to ascertain an assistance function control signal on the basis of surroundings data detected by the surroundings sensor system, said assistance function control signal being in a specified functional relationship with at least one assistance system parameter and the detected surroundings data, and to actuate the vehicle so as to provide an assistance function by means of the assistance function control signal. The analysis module is equipped and designed so as to ascertain a success value for the assistance function control signal using reference information and to initiate an optimization of the at least one assistance system parameter if the success value falls below a success threshold.

21 Claims, 2 Drawing Sheets

(51) Int. Cl.
*G07C 5/08* (2006.01)
*B60W 50/00* (2006.01)

(52) U.S. Cl.
CPC ..... *G07C 5/085* (2013.01); *B60W 2050/0088* (2013.01); *B60W 2420/42* (2013.01)

(56) References Cited

U.S. PATENT DOCUMENTS

| | | | |
|---|---|---|---|
| 11,092,965 B2* | 8/2021 | Hoedt | B60W 50/0098 |
| 2018/0188031 A1 | 7/2018 | Samper et al. | |
| 2019/0100195 A1 | 4/2019 | Rothhamel | |
| 2020/0026296 A1 | 1/2020 | Hoedt | |
| 2022/0118993 A1* | 4/2022 | Schneider | B60W 50/08 |

* cited by examiner

DRIVER ASSISTANCE SYSTEM AND METHOD FOR AN ASSISTED OPERATION OF A MOTOR VEHICLE

The invention relates to a driver assistance system for a motor vehicle (ego vehicle) equipped with the driver assistance system and to a method for the assisted operation of a motor vehicle. The motor vehicle is preferably a wheeled motor vehicle, such as an automobile or a truck.

Known driver assistance systems use a surroundings sensor system to record their surroundings in order to assist the driver of a vehicle with his vehicle control tasks or to at least partially take over these tasks. One known driver assistance system is an emergency braking assistant that prevents or alleviates a collision of an ego vehicle equipped with the emergency braking assistant with other road users. To this end, the emergency braking assistant, based on surroundings data recorded for example by way of a camera and/or a radar, detects an object in the surroundings of the vehicle, its direction of movement and speed of movement. The emergency braking assistant ascertains a probability of collision and a time to a possible collision with the object. If the time to possible collision falls below a threshold below which there is no longer enough time for a braking procedure for avoiding the collision from the current speed, the emergency braking assistant initiates assisted or automatic braking. The time required by a braking procedure to avoid a collision is calculated for example from the current vehicle speed and a maximum possible deceleration of the vehicle. The maximum possible deceleration or the threshold from which the emergency braking procedure is initiated are parameters that may be installed permanently in the assistance system and are calibrated during the development of the driver assistance system on the basis of empirical data and/or physical models for a desired system performance under certain conditions.

In most known driver assistance systems, the function and performance depends on one or more assistance system parameters that are calibrated during the development of the driver assistance system on the basis of a limited number of empirical data, physical models and/or for specific functional scenarios. Since the data used for the development and the functional scenarios taken into consideration are nevertheless not able to give a complete image of the real road scene and a model always represents only a better or worse approximation to physical reality, the one or more assistance system parameters remains or remain suboptimal at least with regard to the individual driving or surroundings situations. Depending on the respective driver assistance system, this leads to weaknesses in the assistance for the driver, these commonly being able to be reproduced at particular locations and/or times when they are attributable at least partially to a systemic cause.

The object of the invention is to overcome the disadvantages of the prior art, in particular to provide a driver assistance system that operates in a reliable and error-free manner in as many traffic situations as possible.

This object is achieved by a driver assistance system as claimed in claim 1. According thereto, a driver assistance system for a motor vehicle comprises a surroundings sensor system, a controller and an assessment module, wherein the controller is designed and intended to ascertain an assistance function control signal based on surroundings data recorded by the surroundings sensor system, which assistance function control signal has a predetermined functional relationship with at least one assistance system parameter and the recorded surroundings data, and to control the vehicle using the assistance function control signal to achieve a vehicle response, wherein the assessment module is designed and intended to ascertain a success value for the assistance function control signal and, if the success value falls below a success threshold value, to trigger optimization of the assistance system parameter.

The object is also achieved by a method for the assisted operation of a motor vehicle with the support of a driver assistance system, wherein the driver assistance system comprises a controller and a surroundings sensor system, wherein the surroundings sensor system records surroundings data, a predetermined functional relationship between at least one assistance system parameter and the recorded surroundings data is evaluated in order to ascertain an assistance function control signal, the vehicle is controlled using the assistance function control signal, a success value for the assistance function control signal is ascertained and, if the success value falls below a success threshold value, optimization of the assistance system parameter is triggered.

The driver assistance system uses the assistance function control signal or a plurality of assistance function control signals ascertained simultaneously or in succession to control further components of the motor vehicle in order to provide the assistance function, such as traffic sign recognition or an automated surroundings-based chassis adjustment. The further components may be contained within the driver assistance system or be designed as modules separate from the system architecture of the motor vehicle and/or stand-alone modules, such as a chassis controller, a user interface or an engine controller. In order to ascertain the assistance function control signal based on the surroundings data, the controller accesses the predetermined functional relationship. The functional relationship comprises at least one computing rule that establishes a deterministic relationship between the surroundings data and the assistance function control signal and the assistance function to be achieved. As an alternative or in addition, the controller for evaluating the functional relationship operates in accordance with a method and/or uses a control loop. The functional relationship, in particular the computing rule, the method and/or the control loop comprises an assistance system parameter or a plurality of assistance system parameters. The assistance system parameters influence the assistance control signal resulting from the functional relationship on the basis of the surroundings data, and thus the system performance.

The assessment module may be designed as a software module operating in accordance with a predetermined method that is executed on the controller of the driver assistance system or on a controller that is spatially separate and/or separate from the system architecture, such as a controller provided with its own vehicle network address. Assessing the current system performance of the driver assistance system on the basis of the assistance function control signal enables a feedback loop via a functional plane of the system. In the event of poor performance of the driver assistance system, the assistance function of the system is improved by improving the at least one assistance system parameter. Improved calibration or another type of optimization of one or more assistance system parameters leads to the improvement in the system performance, increased availability or improved reliability.

In one preferred embodiment, the assessment module is able to be connected to a driving dynamics sensor and/or a surroundings sensor system and is designed and intended to ascertain a success value from vehicle response data from the driving dynamics sensor and/or surroundings data from the surroundings sensor system. The assessment module is in particular able to be connected to a plurality of driving dynamics sensors, such as an acceleration, wheel speed and/or angle of rotation sensor, such that it receives vehicle response data from the driving dynamics sensors. The assessment module is in particular designed and intended to ascertain a success value by virtue of measured vehicle response data and/or surroundings data being correlated with a target criterion by way of a predefined assessment rule. A physical assessment measured variable is preferably ascertained from the vehicle response data and/or surroundings data. By way of example, the assessment measured variable is an acceleration or displacement of the vehicle in one of the directions in space that is recorded in particular by way of acceleration sensors and/or a camera and/or compared with the respective other vehicle response data and/or surroundings data.

The assessment module in particular ascertains the success value from vehicle response data and/or surroundings data that are recorded at a response time. Surroundings data on the basis of which the assistance function control signal was ascertained are in particular recorded at a recording time. The response time and/or recording time may also be a duration, depending on the driver assistance function. A distinction is in particular drawn between response time and recording time. The response time in particular begins at least a system response duration after the recording time. Vehicle response data preferably comprise data of a physical variable different from the surroundings data, which variable is correlated with the vehicle response data by the assessment model for comparison using a computing rule, and/or are recorded by way of another physical principle.

In one preferred embodiment, the driver assistance system has a memory, wherein the controller is designed and intended to record surroundings data at a recording time and to record vehicle response data and/or surroundings data at a vehicle response time. Surroundings data recorded at a recording time are evaluated by the driver assistance system in order to ascertain an assistance function control signal from the functional relationship. Surroundings data for determining the vehicle response may additionally be recorded at a later vehicle response time, for example in order to check the plausibility of recorded vehicle response data or to replace them in the event of a sensor fault.

In one preferred embodiment, the driver assistance system comprises an absolute position sensor and a memory that contains surroundings data and/or vehicle response data associated with absolute vehicle positions, in particular recorded at an earlier respective vehicle response time, wherein the assessment module is designed and intended to form reference information from surroundings data and/or vehicle response data of the memory for a current vehicle position measured using the absolute position sensor. The stored surroundings data and/or vehicle response data are preferably assigned a success value that was ascertained at the earlier respective vehicle response time. The assessment module ascertains a success value for the assistance control signal ascertained based on the surroundings data recorded at the recording time by comparing and/or correlating the reference information.

The respective assistance system parameter in the memory is in particular also associated with the vehicle response data, such that an assistance system parameter that has achieved a higher success value in accordance with vehicle responses is able to be retrieved from the memory for the future ascertainment of an assistance function control signal at this vehicle position. The assistance system parameter associated in the memory is preferably retrieved as soon as the optimization is triggered by the assessment module.

In one preferred embodiment, the driver assistance system comprises a user interface, wherein the assessment module is designed and intended, in order to ascertain the success value, to control the user interface so as to output a user query and receive a user input. Using the user interface, a user of the driver assistance system is able to assess the vehicle response caused by the assistance control signal. The user input forms the success value exclusively or is incorporated into an ascertainment of the success value by the assessment module. The assessment module preferably gives priority to user inputs received via the user interface when ascertaining the success value.

In one preferred embodiment, the assessment module is designed and intended, in order to ascertain the success value, to compare surroundings data and/or vehicle response data present in the memory for a current vehicle position measured using the absolute position sensor with the recorded surroundings data and/or vehicle response data in a predefined order, to assess vehicle response data and/or surroundings data with regard to at least one target criterion and/or to control a user interface so as to output a user query and receive a user input. The assessment module in particular first of all checks whether the memory contains surroundings data and/or vehicle response data for these positions that may serve as reference information.

If the memory does not contain any data for the current vehicle position, the measured vehicle response data and/or surroundings are assessed on the basis of a target criterion in order to ascertain the success value. Depending on the assistance function, the target criterion for the vehicle response data and/or surroundings data contains the fact that data values, data average values, physical variables or values derived from the data and/or filtered data are maximized or minimized and/or lie in a predetermined range. In accordance with the target criterion being met, the assessment module assigns a success value to the assistance control signal that influenced the vehicle response data and/or surroundings data recorded at the response time.

In one preferred embodiment, the controller is designed and intended to erase the surroundings data and the vehicle response data from the memory when the success value is equal to or greater than the success threshold value.

The assessment module is in particular designed and intended to associate the success value with the surroundings data stored at the recording time and/or the vehicle response data stored at the vehicle response time in the memory through a unique identification feature, such as a sequential number.

In one preferred embodiment, the driver assistance system comprises an optimization module that is designed and intended to amend the assistance system parameter based on one or more of the success value, reference information, vehicle response data, surroundings data, absolute position data and time data. The optimization module, in a manner triggered by the assessment module, in particular retrieves at least one assistance system parameter from a memory. The optimization module in particular ascertains an optimized assistance system parameter as soon as the assessment module has triggered optimization of the at least one assistance system parameter, at the same absolute position, at least 3, 5 or 10 times. The optimization module preferably uses a machine learning method, such as a neural network, to optimize the at least one assistance system parameter based on surroundings data and/or vehicle response data and/or success values present in the memory, in particular for the same absolute position.

In one preferred embodiment, the optimization module is designed and intended to amend the assistance system parameter in a location-specific and/or time-specific manner. To this end, the optimization module stores an association of assistance system parameters optimized for particular absolute positions. The assignment may also have a time dimension such that the assistance system parameter is predefined to the driver assistance system in both a location-dependent and time-dependent manner.

The aspects described here with reference to the driver assistance system apply analogously to the disclosed method, which may be implemented for example by the controller. This may be performed by carrying out appropriate write and read access operations to a memory associated with the motor vehicle. The method is implemented in particular within the motor vehicle in hardware or software or else a combination of hardware and software. The hardware comprises in particular digital signal processors, application-specific integrated circuits, field-programmable gate arrays and other suitable switching and computing components. The driver assistance system according to the invention in particular operates in accordance with the method according to the invention.

Further advantages, features and properties of the invention are explained on the basis of the description of preferred embodiments of the invention with reference to the figures, in which.

Figure 1:
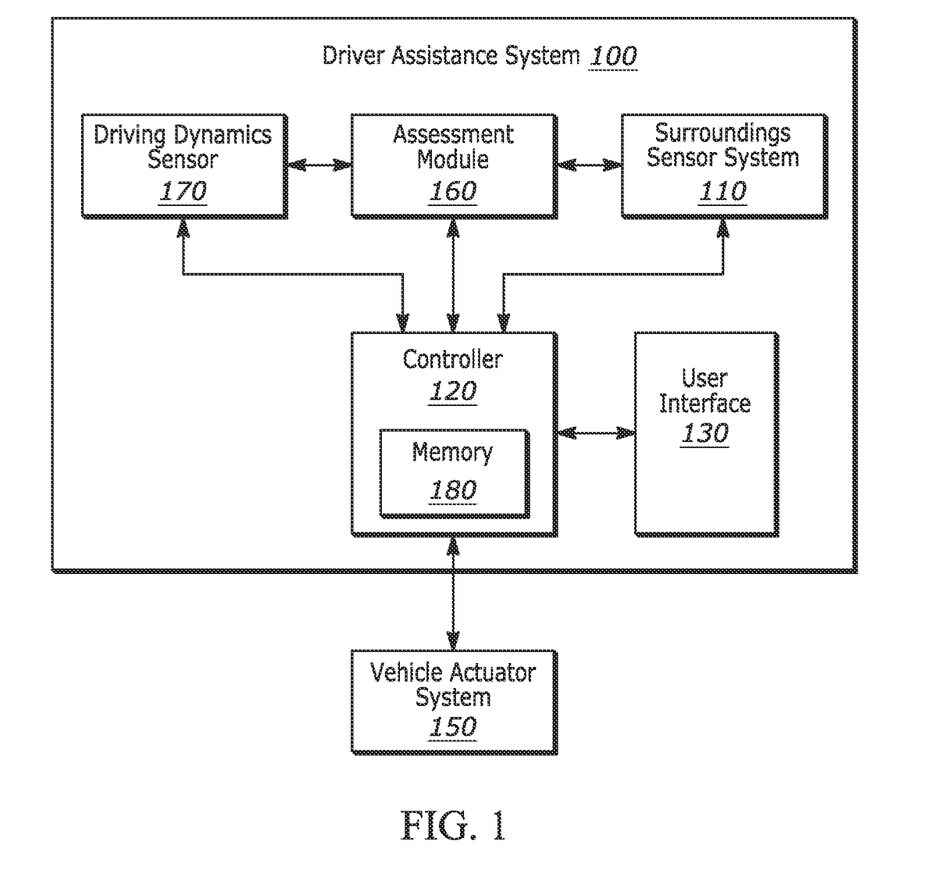
FIG. 1: shows a schematic illustration of one exemplary embodiment of a driver assistance system according to the invention

A driver assistance system 100 according to the invention, as shown in FIG. 1, comprises a controller 120 that is connected to a surroundings sensor system 110. The driver assistance system 100 is installed in an ego vehicle, that is to say equipped with the driver assistance system, and executes one or more assistance functions that partially or fully relieve a driver of the ego vehicle from the task of driving the vehicle.

The surroundings sensor system 110 comprises in particular a video camera or a plurality of video cameras integrated into the vehicle, infrared cameras, radar sensors, lidar sensors, ultrasound sensors and/or satellite-assisted absolute position sensors. The surroundings data that are obtained using the surroundings sensor system 110 are in particular objects, object positions, object speeds in a plurality of directions in space, object edges, object images, an object distance and relative data able to be ascertained therefrom between the ego vehicle and a respective object. An object is understood to mean both static road traffic components relevant to traffic, such as road markings, traffic signs or the road surface, and moving components, such as people or vehicles. The controller 120 receives, from the surroundings sensor system 110, surroundings data that represent the surroundings of the motor vehicle in a form able to be processed by the driver assistance system.

The controller 120 is connected to a user interface 130. The user interface 130 may be a touch-sensitive screen or be formed by a system having one or more input and/or output devices, such as touch-sensitive operating elements, buttons, screens, light or image projection modules, loudspeakers or haptic actuators.

The controller 120 generates assistance function control signals that are output to a vehicle actuator system 150, such as an adaptive chassis, that implements the assistance function of the driver assistance system 100. If the assistance function makes provision for an indication to the driver to be triggered by way of the assistance function control signal, the assistance function control signal is transmitted to the user interface 130, which provides assistance information to the user of the driver assistance system 100.

The controller 120 receives vehicle response data from a driving dynamics sensor 170. The vehicle response data comprise information about the current vehicle state and vehicle movement, such as ego speed, accelerations in various directions in space, wheel speeds, wheel slip data and/or steering angle.

An assessment module 160 is connected to the controller 120, the driving dynamics sensor 170 and the surroundings sensor system 110. The assessment module is able to be connected for data transmission to the user interface and a memory 180 of the driver assistance system via the connection to the controller 120.

In the simplest case, the controller 120 evaluates surroundings data from the surroundings sensor system 110 in accordance with a predetermined program code that comprises, in its entirety, a functional relationship of the respective assistance function. The functional relationship contains a plurality of assistance system parameters that are prepopulated, when the driver assistance system 100 is delivered, with a standard value ascertained when the system is developed (standard assistance system parameter). The result of the evaluation is an assistance control signal that the controller 120 transmits for example to a vehicle actuator system 150 in order to initiate emergency braking. As an alternative or in addition, the controller, depending on the assistance function, transmits the assistance control signal to the user interface 130.

Based on the assistance function control signal, there is a response from the vehicle, be this braking or the outputting of a warning signal via the user interface 130. During the response of the vehicle, that is to say at a response time, the assessment module 160 receives vehicle response data and/or surroundings data relating to the vehicle response triggered by the assistance function control signal via the controller 120 or directly from the driving dynamics sensor 170 or the surroundings sensor system 110. With regard to the user interface 130, confirmation regarding the successful outputting of an indication may be received at the assessment module 160. The assessment module 160 correlates the vehicle response data representing the vehicle response and/or surroundings data with reference information specific to the assistance function and ascertains how close the vehicle response brought about by the assistance control signal comes to the target state represented by the reference information. This assessment results in a success value ascertained by the assessment module 160.

For the success value, a threshold value is predefined for the assessment module 160, and the assessment module triggers optimization of the assistance function when said threshold value is fallen below. The optimization is performed by adjusting the at least one assistance system parameter.

The optimization of the assistance system parameter is taken on by an optimization module that may be implemented in the controller 120. The optimization module operates using known optimization methods, machine learning methods or in accordance with a predetermined optimization rule for one or more assistance system parameters.

According to a second exemplary embodiment, the driver assistance system 100 is designed as an automated chassis adjustment system. Unless explicitly stated otherwise below or contradicting the above description, this exemplary embodiment operates in a manner identical to the exemplary embodiment described above.

The surroundings sensor system 110 of the automated chassis adjustment system comprises at least a camera and a satellite-assisted absolute position sensor. The camera provides image data for the chassis adjustment system. A controller 120 of the chassis adjustment system evaluates the image data from the camera with regard to road unevennesses ahead and automatically adjusts the chassis for improved driving comfort. Using an optical model, the controller 120 ascertains road unevennesses and the position thereof with respect to the vehicle from the image data. The controller 120 also determines the position of the ego vehicle, for example using the absolute position sensor, for example a GPS module, and/or odometry. If the ego vehicle reaches the position at which the unevenness was recorded, the controller 120 outputs an assistance function control signal to a chassis controller in order to move the vehicle over the unevenness with the smallest possible rolling movement. The chassis does not have to be manually adjusted by the driver. The automated chassis adjustment system comprises a plurality of assistance system parameters, such as gain factors, time constants and threshold values for an assistance function relationship, formed from recognition algorithms, control algorithms and logic components, between the surroundings data and the assistance control signal or, in other words, between recorded unevenness and adjustment of the chassis. The functional relationship of the automated chassis adjustment system may comprise a driving dynamics model from which vehicle movements are able to be ascertained on the basis of driving dynamics data. The driving dynamics model contains assumptions about constant model parameters, such as vehicle and/or surroundings parameters. One or more model parameters that are physically linked to measurable vehicle response data are designed as optimizable assistance system parameters according to the invention.

The assessment module 160 is implemented on the controller 120 or in a further controller of the chassis adjustment system and records reference information by retrieving vehicle response data, such as data from a driving dynamics sensor 170, for example accelerations in the x, y and z direction, wheel speeds or wheel slip. The assessment module 160 uses a predefined assessment rule to ascertain a success value for the automated chassis adjustment from the vehicle response data, that is to say an indicator as to how well the unevenness was compensated for. The assessment rule comprises for example checking whether predetermined maximum acceleration and/or positional displacement values were exceeded. The assessment rule contains target criteria for the assistance function, for example, in the case of the automated chassis adjustment system, the avoidance of significant rolling movements, measured in terms of displacement of the vehicle in one or more directions. The result of applying the assessment rule to the vehicle response data is a success value that indicates how well the assistance function worked in the respective assistance situation, here how well the road unevenness was compensated for.

As an alternative or in addition, the assessment module 160 outputs a query to the user of the assistance system via the user interface 130 in which said user is able to assess whether he was satisfied with the assistance functionality in the current situation. If a user query is not responded to by the user via the user interface 130, the automated ascertainment of the success value, as described above, on the basis of the vehicle response data is used. If the query is additionally made via the user interface 130, the assessment rule combines the assessment of the vehicle response data with the assessment received via the user interface 130 in the form of a user input.

After ascertaining the success value fed back by the user via the user interface 130, the success value ascertained automatically by assessing the vehicle response data or the success value ascertained in combination, the assessment module 160 prompts the controller 120 to move the surroundings data recorded at the recording time for the assessed situation, the surroundings data and/or vehicle response data recorded at the response time, the respective absolute vehicle position and time for the respective data and the ascertained success value from a buffer memory to a long-term memory. The buffer memory and the long-term memory may be organized logically by the controller 120 in the form of subregions of the memory 180. The content of the long-term memory is maintained when the vehicle is deactivated and is enabled in response to an erasure command of the controller 120.

Upon each new entry or cyclically following a predetermined number of entries to the long-term memory, the controller 120 checks whether multiple entries are present for the same location in the long-term memory. As an alternative or in addition, the controller 120, upon each new entry or cyclically, checks for correlations in the stored data independently of the location of the entry, such as a frequency of threshold exceedances for vehicle response data.

The controller 120 checks whether an optimization condition is present, such as the presence of multiple entries at the same location or the occurrence of a poor success value at least 5 times in the case of a high z position offset, and initiates optimization of an assistance system parameter if the optimization condition is met. The automated chassis adjustment system may be designed such that exactly one assistance system parameter, such as a gain factor of a control algorithm, is adjusted. The controller 120 in particular uses the vehicle response data to determine which of a plurality of assistance system parameters should be optimized. To this end, the controller 120 may have a predetermined assignment and an optimization rule. By way of example, vehicle response data that represent an acceleration in the z direction may be assigned a gain factor for a damping control algorithm in the z direction as assistance system parameter. By way of example, it is possible to implement, as a rule, that the gain factor for damping control in a respective direction is increased by a predetermined value in the event of a high positional offset in the respective direction. As an alternative, the assistance system parameter to be optimized is ascertained by a neural network that is implemented on the controller 120. Depending on the selected optimization rule or selected machine learning method, it is possible to process all data present in the long-term memory. In the case of successful optimization, the optimization module replaces the at least one assistance system parameter in the functional relationship with the at least one optimized assistance system parameter.

In one variant of the exemplary embodiment, the assistance system parameter is adjusted in a temporally and/or locally limited manner. For a particular location at which the success threshold value has been fallen below multiple times, an assistance system parameter for this location will thus be adjusted. As an alternative or in addition, the assistance system parameter may be adjusted in a manner specific to the time of day and/or time of year. By way of example, this may be expedient in the case of systematic recording errors made by the camera due to particular time-specific and/or location-specific lighting conditions. Assistance system parameters potentially able to be adjusted are parameters linked to lighting conditions in the image processing algorithms that extract road unevennesses from the surroundings data. The location-specific and/or time-specific adjusted values for the assistance system parameter are stored in an assignment table. The controller 120 gives priority to the assistance system parameters from the assignment table over a standard assistance system parameter if the vehicle is located at the same absolute position. A standard assistance system parameter should be understood to mean that this is locally and temporally valid without any limitations, at least until it is possibly amended by the optimization module.

As an alternative or in addition to a temporally and/or locally limited adjustment, the standard assistance system parameter is amended by the optimization module. This has the effect of changing the overall system behavior. The controller 120 may comprise a plurality of optimization conditions and be designed, when a first optimization condition is present, to initialize a temporally and locally limited adjustment of the assistance system parameter and, when a second optimization condition is present, to optimize the one or more standard assistance system parameters.

According to a further exemplary embodiment, the driver assistance system is designed as an emergency braking assistant. Unless explicitly stated otherwise below or contradicting the above description, this exemplary embodiment operates in a manner identical to the exemplary embodiments described above. The surroundings sensor system 110 comprises, for an emergency braking assistant, at least one distance sensor that provides distance data with regard to an object recorded in the surroundings of the ego vehicle as surroundings data and provides them to the ego vehicle. The emergency braking assistant ascertains whether there is a threat of a collision from the distance data and the speed of the ego vehicle. If and when emergency braking is triggered by the emergency braking system is determined by a controller 120 of the emergency braking system on the basis of predefined criteria, such as the distance between object and ego vehicle, relative speed and deceleration capability of the ego vehicle. When determining the assistance function control signal that triggers the emergency braking, the controller 120 of the emergency braking assistant processes a functional relationship between relative speed, distance and deceleration capability. The deceleration capability may be stored in the emergency braking assistant as an assistance system parameter or be represented by a model that comprises assistance system parameters, such as a predefined coefficient of friction between road and wheel of the ego vehicle or a wear state of the braking system. The assistance system parameter is prepopulated, in the delivery state of the ego vehicle, with a standard assistance system parameter that was determined during the development of the emergency braking assistant.

An assessment module 160 of the emergency braking assistant, which may be implemented in the controller 120 or be designed as a separate electronic module or controller, records the braking behavior during emergency braking. By way of example, decelerations in the X and Y direction, a wheel slip and/or a distance profile in relation to the object are recorded as vehicle response data. In order to ascertain the success value, the assessment module 160 compares measured or averaged vehicle response data with a corresponding standard assistance system parameter, for example deceleration in the X direction, or uses an assessment rule that takes into consideration further influencing factors. By way of example, the assessment rule combines a difference between the distance to the object as achieved by way of the emergency braking maneuver and an expected distance to the object and a difference between the achieved deceleration and an expected deceleration. If the success value of the emergency braking assistant falls below a success threshold value, at least one assistance system parameter is optimized by the optimization module on the basis of the vehicle response data and/or the surroundings data.

The assessment module 160 may additionally monitor whether the assistance control signal of the emergency braking assistant is revoked by the controller 120, for example because it emerges from the functional relationship, due to changed surroundings data, that the assistance function control signal is no longer valid. This may be caused by temporary incorrect recognition of an object and/or incorrect ascertainment of surroundings data relating to the object. Revocation of the assistance control signal may be recorded by the assessment module 160 based on vehicle response data, for example from a terminated braking procedure or status information of the controller 120, and be populated with a success value below the success threshold value. Situations in which the emergency braking assistant operates incorrectly are thus recognized and used to optimize one or more assistance system parameters. The optimization module in this case processes in particular the surroundings data recorded at the time of the incorrect recognition.

According to a further exemplary embodiment, the driver assistance system is designed as a traffic sign recognition system. Unless explicitly stated otherwise below or contradicting the above description, this exemplary embodiment operates in a manner identical to the exemplary embodiments described above. The surroundings sensor system 110 comprises, for the traffic sign recognition system, at least a camera that ascertains traffic signs from image data using known methods, and an absolute position sensor, such as a GPS module, which provides position data for the ego vehicle. The traffic sign recognition system may also ascertain the position of the traffic signs in relation to the vehicle.

Owing to the temporary concealment of traffic signs, for example by other road users or foliage, a camera may recognize traffic signs to a poor extent or not at all. The traffic sign recognition uses known image processing methods in order to extract traffic signs from the surroundings data. The image processing methods and display logic expanding thereon, used by the controller 120 of the traffic sign recognition system to generate an assistance function control signal and to output an assistance indication via a user interface 130, comprise at least one assistance system parameter. The assistance system parameter is for example a parameter in the image processing method and/or a threshold value on the basis of which an assistance function control signal for outputting or not outputting one of the traffic signs. As a result of the assistance function control signal, a recognized or unrecognized traffic sign or a fault message is or is not output, in particular is or is not displayed, as a vehicle response.

The assessment module 160, for reference information, accesses surroundings data in the memory 180, in particular a long-term memory, in which known traffic signs are associated with absolute positions, such as traffic signs recognized and stored at an earlier time.

To ascertain the success value, the assessment module 160 compares the assistance control signal, representing display or lack of display or incorrect display, with the reference information provided from the memory 180. As an alternative or in addition, in order to ascertain the success value, a query may be controlled via the user interface 130. As an alternative or in addition, ascertaining the success value comprises recording vehicle response data, such as acceleration data from a driving dynamics sensor. The latter measure may be used to incorporate the behavior of the driver of the ego vehicle as a result of the assistance control signal. If the assistance function control signal brings about the display of a speed limit that is below the current speed of the ego vehicle without the driver of the ego vehicle responding, for example with a braking procedure in response to the assistance function control signal, this may be incorporated into the ascertainment of the success value as an indicator of incorrect recognition by the traffic sign recognition system.

Figure 2:
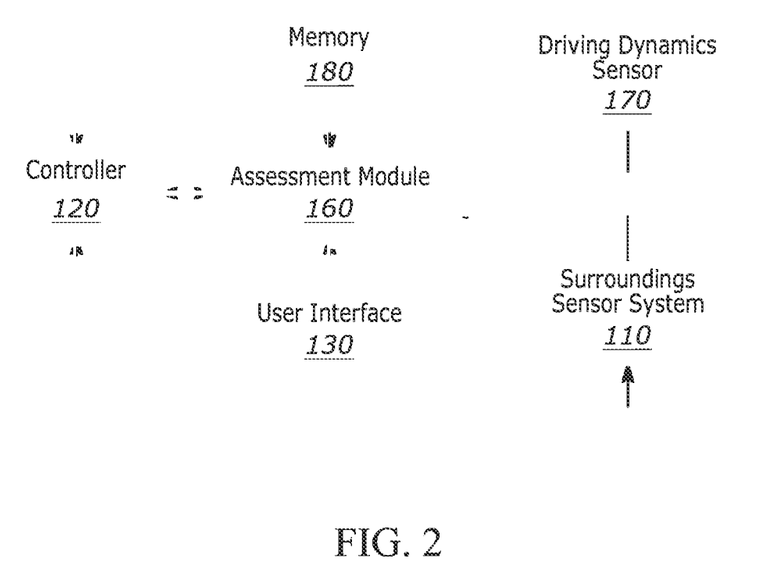
FIG. 2: shows a schematic illustration of the data flow to and from the assessment module according to one exemplary embodiment according to the invention.

FIG. 2 schematically illustrates how the assessment module 160 ascertains the success value through comparison with reference information. The assessment module 160 receives an assistance function control signal from the controller 120 and ascertains reference information. As described above for the automated chassis adjustment system, ascertaining the reference information may comprise vehicle response data from a driving dynamics sensor 170 being processed. The assessment module 160 comprises, for the vehicle response data, an assessment rule taking into consideration a target criterion as reference information, such as minimizing the accelerations in the Z direction. The vehicle response data are assessed with regard to the reference information, in particular using a predefined assessment rule.

As an alternative or in addition, ascertaining the reference information comprises comparing the surroundings data on which the assistance control signal is based with surroundings data that are stored in the memory 180 for the same absolute position. Differences from the predefined reference information lead to a depreciation with regard to the success value, and matching or reaching a target criterion lead to an increase in the success value. If ascertaining the reference information comprises a plurality of the abovementioned alternatives, the respective individual ratings may be taken into consideration in a manner weighted with respect to one another.

As an alternative or in addition, a driver-controlled assessment of the assistance control signal via the user interface 130 may be controlled by the assessment module 160 and taken into consideration when ascertaining the success value.

In one particular embodiment that also corresponds to the exemplary embodiment of FIG. 1, all of the components of the driver assistance system 100 are integrated in a common housing of a camera, together with a lens and an imaging sensor of the camera.

The variants described above and their structural and operational aspects serve only to improve understanding of the structure, the mode of operation and the properties; they do not restrict the disclosure for instance to the mentioned exemplary embodiments. In this case, any mode of operation, any principle, any technical design and any feature disclosed in the figure or in the text may be combined freely and as desired with all of the claims, any feature in the text, other modes of operation, principles, technical refinements and features that are contained in this disclosure or result therefrom, meaning that all conceivable combinations of the described procedure may be encompassed. In this case, combinations between all of the individual embodiments in the text, that is to say in each section of the description, in the claims and also combinations between different variants in the text, in the claims and in the figure are also included. The claims also do not limit the disclosure and thus the options for combining all indicated features with one another. All of the disclosed features are explicitly also disclosed individually and in combination with all of the other features here.

LIST OF REFERENCE SIGNS

100 driver assistance system
110 surroundings sensor system
120 controller
130 user interface
150 vehicle actuator system
160 assessment module
170 driving dynamics sensor
180 memory

The invention claimed is:

1. A driver assistance system for a motor vehicle, comprising
a surroundings sensor system for recording surroundings data related to an object around the motor vehicle,
a controller, and
an assessment module,
wherein the controller is designed and intended:
to ascertain an assistance function control signal responsive to the object and based on the surroundings data, the assistance function control signal having a predetermined functional relationship with at least one assistance system parameter and the recorded surroundings data, and
to control the vehicle using the assistance function control signal so as to provide an assistance function, and
wherein the assessment module is designed and intended to ascertain a success value for the assistance function control signal indicative of the motor vehicle response to the object on the basis of reference information and, if the success falls below a success threshold value, to trigger optimization of the at least one assistance system parameter.

2. The driver assistance system as claimed in claim 1, wherein the assessment module is able to be connected to a driving dynamics sensor and/or the surroundings sensor system and is designed and intended to ascertain the reference information from vehicle response data recorded using the driving dynamics sensor and/or the surroundings data recorded using the surroundings sensor system.

3. The driver assistance system as claimed in claim 1, wherein the controller is designed and intended to record the surroundings data at a recording time and to record vehicle response data and/or surroundings data at a reference information time.

4. The driver assistance system as claimed in claim 1, comprising an absolute position sensor and a memory that contains the surroundings data and/or vehicle response data associated with absolute vehicle positions, wherein the assessment module is designed and intended to form the reference information from the surroundings data and/or the vehicle response data of the memory for a current vehicle position measured using the absolute position sensor.

5. The driver assistance system as claimed in claim 4, wherein the assessment module is designed and intended, in order to ascertain the success value, to compare the surroundings data and/or the vehicle response data present in the memory for a current vehicle position measured using the absolute position sensor with the recorded surroundings data and/or the vehicle response data in a predefined order, to assess the vehicle response data with regard to at least one target criterion and/or to control a user interface so as to output a user query and receive a user input.

6. The driver assistance system as claimed in claim 1, furthermore comprising a user interface, wherein the assessment module is designed and intended, in order to ascertain the success value, to control the user interface so as to output a user query and receive a user input.

7. The driver assistance system as claimed in claim 1, comprising an optimization module that is designed and intended to amend the assistance system parameter based on one or more of the success value, reference information, vehicle response data, surroundings data, absolute position data and time data.

8. The driver assistance system as claimed in claim 7, wherein the optimization module is designed and intended to amend the assistance system parameter in a location-specific and/or time-specific manner.

9. The driver assistance system as claimed in claim 1, wherein the surroundings sensor system comprises a camera having a lens and an imaging sensor and the controller is arranged in a common housing with the lens and the imaging sensor.

10. The driver assistance as claimed in claim 1, wherein the assistance function control signal controls a chassis of the motor vehicle and the surroundings data includes road unevenness data.

11. The driver assistance system as claimed in clam 1, wherein the assistance function control signal controls emergency braking of the motor vehicle and the surroundings data includes at least one of speed and movement of the object.

12. The driver assistance system as claimed in claim 1, wherein the assistance function control signal adjusts a traffic sign recognition system and the surroundings data includes image data related to at least one traffic sign.

13. A method for the assisted operation of a motor vehicle with the support of a driver assistance system, comprising a controller and a surroundings sensor system, for recording surroundings data related to an object exterior to the motor vehicle, a predetermined functional relationship is evaluated by the controller based on the recorded surroundings data and at least one assistance system parameter in order to ascertain at least one assistance function control signal responsive to the object, the vehicle is controlled using the assistance function control signal, reference information relating to the assistance function control signal is recorded, a success value for the assistance control signal indicative of the motor vehicle response to the object is ascertained and, if the success value falls below a success threshold value, optimization of the assistance system parameter is triggered.

14. The method as clained in claim 13, wherein the assistance function control signal controls a chassis of the motor vehicle and the surroundings data includes road unevenness data.

15. The method as claimed in claim 14, wherein the vehicle response data comprises displacement of the motor vehicle in at least one direction and the success value is indicative of the assistance function control signal preventing motor vehicle rolling movements.

16. The method as claimed in claim 15, wherein the success value reflects whether maximum acceleration and/or positional displacement values are exceeded.

17. The method as claimed in claim 14, further comprising:
   setting a first gain factor of a damping control algorithm in a vehicle direction as the assistance system parameter;
   recording vehicle response data comprising vehicle acceleration in the direction in response to control of the vehicle using the assistance function control signal;
   correlating the recorded vehicle response data with a second gain factor;
   adjusting the first gain factor when the second gain facotor indicates a high positional offset in the direction.

18. The method as claimed in claim 13, wherein the assistance function control signal controls emergency braking of the motor vehicle and the surroundings data includes at least one of speed and movement of the object.

19. The method as claimed in claim 18, further comprising:
   setting a first deceleration in a vehicle direction as the assistance system parameter;
   recording vehicle response data comprising a first distance from the vehicle to the object and a second deceleration in response to control of the vehicle using the assistance function control signal;
   establishing the success value by determing differences between:
      the first distance and an expected distance to the object stored in memory; and
      the first and second decelerations; and
   adjusting the first deceleration when the success value falls below the success threshold value.

20. The method as claimed in claim 13, wherein the assistance function control signal adjusts a traffic sign recognition system and the surroundings data includes image data related to at least one traffic sign.

21. The method as claimed in claim 20, further comprising:
   setting an image processing parameter as the at least one assistance system parameter;
   recording vehicle response data comprising image data around the vehicle in response to control of the vehicle using the at least one assistance function control signal;
   establishing the success value by comparing the image data with reference information;
   adjusting the image processing parameter when the success value falls below the success threshold value.

* * * * *